United States Patent [19]

Reinartz et al.

[11] Patent Number: 5,340,285

[45] Date of Patent: Aug. 23, 1994

[54] MOTOR PUMP ASSEMBLY WITH VARIABLY SET ECCENTRIC

[75] Inventors: Hans-Dieter Reinartz, Frankfurt am Main; Helmut Steffes, Hattersheim, both of Fed. Rep. of Germany

[73] Assignee: Alfred Teves GmbH, Fed. Rep. of Germany

[21] Appl. No.: 984,581

[22] PCT Filed: Jul. 1, 1992

[86] PCT No.: PCT/EP92/01487

§ 371 Date: Mar. 8, 1993

§ 102(e) Date: Mar. 8, 1993

[87] PCT Pub. No.: WO93/01073

PCT Pub. Date: Jan. 21, 1993

[30] Foreign Application Priority Data

Jul. 6, 1991 [DE] Fed. Rep. of Germany ....... 4122486

[51] Int. Cl.⁵ .................... F04B 1/06; G05G 1/00; F16H 35/08
[52] U.S. Cl. ......................... 417/221; 74/571 M; 74/836
[58] Field of Search ............ 417/214, 221; 74/571 M, 74/835, 836

[56] References Cited

U.S. PATENT DOCUMENTS

| | | |
|---|---|---|
| 2,348,958 | 5/1944 | Celio .................. 74/571 M X |
| 3,628,889 | 12/1971 | Kobayashi et al. ............ 417/221 |
| 3,827,831 | 8/1974 | Lines . |
| 4,022,082 | 5/1977 | Uchimoto ................ 74/836 X |
| 4,249,424 | 2/1981 | Glazier ................. 74/836 X |
| 4,768,421 | 9/1988 | Schneeweiss ........... 417/221 X |

FOREIGN PATENT DOCUMENTS

| | | |
|---|---|---|
| 2503274 | 10/1982 | France . |
| 2577625 | 8/1986 | France . |
| 957442 | 1/1957 | Netherlands . |
| 1908931 | 10/1969 | Netherlands . |
| WO9003520 | 4/1990 | PCT Int'l Appl. . |
| 204332 | 4/1939 | Switzerland . |

*Primary Examiner*—Edward K. Look
*Assistant Examiner*—John Ryznic
*Attorney, Agent, or Firm*—Robert P. Seitter; J. Gordon Lewis

[57] ABSTRACT

The present invention relates to a drive assembly, in particular a motor pump assembly for slip-controlled brake systems, with a device for transforming rotatory into translatory movements, including a drive shaft which is movably guided in a housing, and an eccentric device which is associated with the drive shaft. In order to be able to change the dimension of the eccentric, it is provided that the eccentric device is formed of two eccentrics which are turnable relative to each other and are in mesh with each other in a form-fit manner, so that at least an eccentric sum dimension formed from the individual eccentric dimensions of two eccentrics, respectively, can be set variably.

7 Claims, 1 Drawing Sheet

MOTOR PUMP ASSEMBLY WITH VARIABLY SET ECCENTRIC

BACKGROUND OF THE INVENTION

The present invention broadly relates to a drive assembly. In particular, the present invention relates to a motor pump assembly for slip-controlled brake systems, that includes a device for transforming rotary movements into translatory movements.

Drive assemblies comprising a device for transforming rotatory motions into translatory motions, for instance oscillating motions, find a wide variety of fields of application in general mechanical engineering. In particular, in industrial hydraulics, motor vehicle hydraulics and in process engineering, drive systems of such drive assemblies are widely used. The kinematics of the assemblies are durably controllable with high precision even under very different conditions of use.

An example of a motor pump assembly is found in the German patent application having the official filing number P 40 278 48.4, which discloses a pump assembly, actuated by means of an electric drive assembly that supplies pressure fluid to a slip-controlled motor vehicle brake system. The drive shaft of the electric motor has, at the shaft end, an eccentric pin. Two pump pistons of a radial piston pump bear against the eccentric pin through the intermediary of a needle bearing. When the drive shaft, guided in rolling bearings, is turned, the pin which is eccentrically arranged at the shaft end performs an eccentric curve which results in the oscillating movement of the pump pistons.

Current designs, such as that described above, permit a limited variation in the delivery volume of pressure fluid by means of a speed control of the electric motor, for example. This result is due to the piston stroke which is determined by the eccentric curve. Typically required control engineering measures demand an improvement over currently-used designs.

SUMMARY OF THE INVENTION

The present invention relates to a motor pump assembly for slip-controlled brake systems that includes an eccentric device that facilitates varying the delivery volume of pressure fluid within the system.

It is, therefore, an object of the present invention to provide an improved drive assembly of the type described above. According to the present invention, the eccentricity of the eccentric device can be varied at will by simple means in order to achieve, for instance in the case of pumps, a control of the delivery volume which is adapted to the pressure fluid requirements of the consumer.

According to the present invention, the eccentric device is formed by means of eccentrics which are turnable relative to each other and are in mesh with each other in a form-fit manner so that the eccentricity of the eccentric and thus the pump piston stroke can be changed. By this means, expensive control and regulating sequences within the circuit controlling the drive motor become superfluous so that, according to the solution proposed in the present invention, a hydromechanical adjustment of the second eccentric can be achieved by means of the pressure level which is directly taken up via a control piston.

These and other objects and features of the present invention will be seen in the following specification and claims in conjunction with the appended drawings, of which the following is a brief description.

DETAILED DESCRIPTION OF A PREFERRED EMBODIMENT

Figure 1:
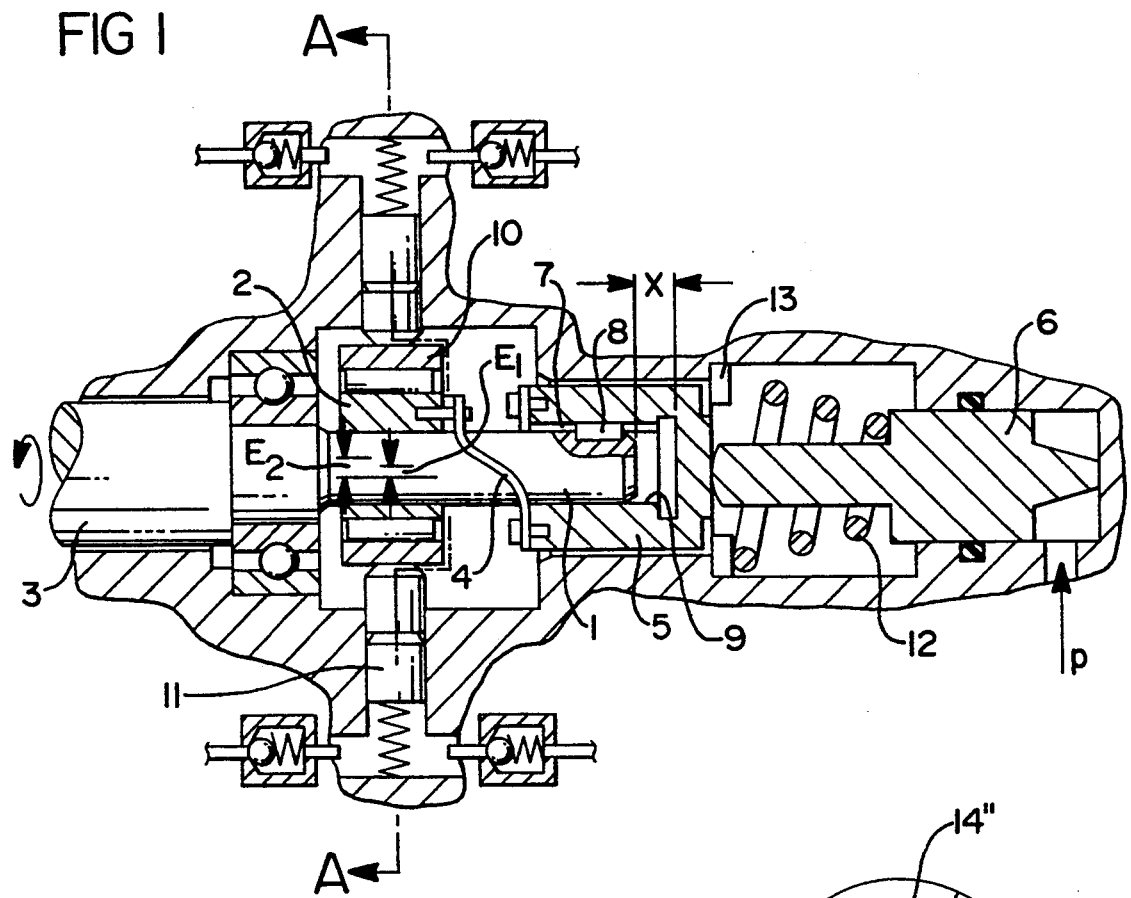
FIG. 1 is a longitudinal cross-sectional view of a radial piston pump.

FIG. 1 shows a drive shaft 3 associated with an electric motor, the drive shaft end being provided with a pin-shaped first eccentric 1. The end of the first eccentric 1 opposite the drive shaft 3 protrudes eccentrically into the control slide 5 which has the shape of a hollow cylinder. A key or wedge-shaped insert 8 is disposed within a longitudinal groove 7 of the first eccentric 1. The arrangement of wedge-shaped insert 8, thereby, provides a positive connection with the bore 9 which is arranged eccentrically in the hollow cylinder in control slide 5. A longitudinal groove 7 is embedded in bore 9 so that the control slide 5 rotates together with the first eccentric 1. Here, the control slide 5 takes on the function of a plain bearing guiding the eccentric pin. A rolling bearing (not shown) guiding the drive shaft 3 is arranged on the shaft portion which is opposite the control slide 5. A second eccentric 2, which is arranged on the first eccentric 1 so as to be turnable, is coupled with the control slide 5 through the intermediary of a spring-elastic actuating element 4. For this purpose, the actuating element 4 is attached to the oppositely facing end faces of the control slide 5 and the second eccentric 2, respectively. When the eccentric device is turned, the second eccentric 2 moves, adjustable relative to the first eccentric 1, on rolling contact with a needle bearing 10 so that the pump pistons 11 arranged on the outer bearing ring carry out an oscillating lift movement. A control piston 6, aligned vertically to the end face of the control slide 5, is acted upon by a pump and/or consumer pressure that bears on the end face of piston 6 opposite from the end facing the control slide 5. Here, the initial position of the control slide 5 is brought about by the actuating element 4 held between the control slide 5 and the second eccentric 2. The compression spring 12, adjacent to the abutment 13, positions the control piston 6 on an abutment surface which is formed fast with the housing and is directed away from the compression spring 12.

Figure 2:
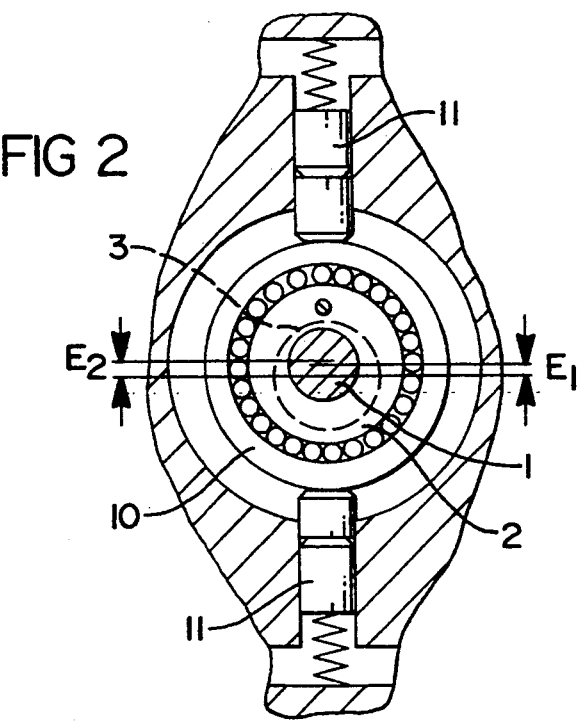
FIG. 2 is a partial cross-sectional view of the radial piston pump of FIG. 1 along the line designated as A—A.

FIG. 2 is a partial cross-sectional view of the pump of FIG. 1, along the line designated as A—A. The drive shaft 3 accommodates the first eccentric 1, and the needle bearing 10 attached to the second eccentric 2. The pump pistons 11 are abutting diametrically against needle bearing 10. In the illustrated position, the first eccentric 1 is turned by the eccentric dimension E1 and the second eccentric 2 is turned by the eccentric dimension E2 relative to the drive shaft 3, so that the radial distances E1 and E2 determine, in dependence upon identical turning angles and thus an identical effective direction, the variable sum dimension is equivalent to the total eccentricity of the eccentric device. The variable sum dimension determines the total stroke of the pump pistons 10.

Figure 3:
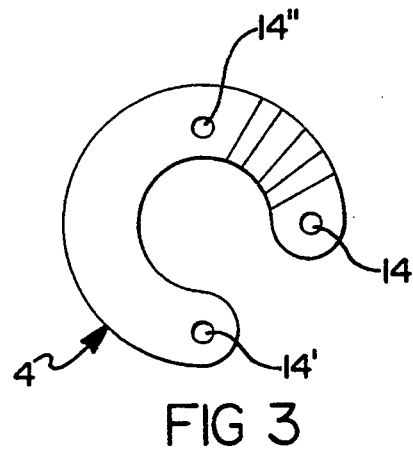
FIG. 3 is a top planar view of the actuating element arranged between the second eccentric and the control slide.

FIG. 3 shows a top view of the corrugated, substantially sickle-shaped adjusting element 4 which extends in the circumferential dimension about 270 degrees. For mounting purposes, the actuating element 4 provided with a plurality of retaining bores 14. A first retaining bore 14' and a second retaining bore 14", arranged clockwise over the circumference of the actuating element 4, 180 degrees apart, serve to attach actuating element 4 to the end face of tile control slide 5. The portion of actuating element 4 between an angular degree of 180 and 270, (i.e., that portion illustrated to the right and below retaining bore 14") however, serves as a torsion spring. The retaining bore 14 at the second end of the elastic portion (270° away from retaining bore 14') is attached to the end face of the second eccentric 2.

The illustrated embodiment works generally as follows.

In the position illustrated in FIG. 1 and FIG. 2, the eccentric device assumes the total delivery position, i.e. the sum eccentricity formed by the eccentricity E1 of the first eccentric 1 and the eccentricity E2 of the second eccentric 2 is at its maximum in terms of amount and direction. Consequently, both pump pistons 11 perform the maximum piston stroke when the drive shaft 3 turns, thereby causing the synchronous revolution of eccentrics 1 and 2 with the control slide 5. Thereby, a delivery volume is applied onto the respective consumer. If the product of pump pressure and control piston surface exceeds the force of the compression spring 12, the control piston 6 displaces the control slide 5, rotating together with the first eccentric 1 from right to left according to the drawing. Therefore, the axial distance between the second eccentric 2 and the control slide 5 diminishes proportionally to the diminution of the distance between the end of eccentric 1 and a reference point on control slide 5 shown by the dimension arrows at x. Inevitably, the actuating element 4, a spring element, is subjected to a compressive force and, therefore, carries out a torsion, whereby the translatory movement of the control slide 5 leads to a rotatory movement of the actuating element 4 and the second eccentric 2 thus becomes effective as well. The nonsynchronous turning of the second eccentric 2 relative to the first eccentric 1, rotating at drive shaft speed, thereby causes a diminution of the eccentricity so that the pump pistons 11 perform a reduced working stroke corresponding to a partial load delivery. Thus, if a respective design is used, including for instance, identical eccentric dimensions (E1=E2) and an adjusting angle of 0° to 180° during the pump operation, a pump regulation between zero delivery up to full delivery can be set continuously.

The preceding description is exemplary rather than limiting in nature. One skilled in that art will realize that variations and modifications may be employed without departing from the purview of the present invention; the scope of which is limited only by the appended claims.

What is claimed is:

1. A motor pump drive assembly for slip-controlled brake systems, with device for transforming rotatory into translatory movements; with, a drive shaft which is movably guided in a housing; comprising:
   an eccentric device which is associated with said drive shaft, said eccentric device being formed of a first and second eccentric, said first and second eccentric being turnable relative to each other and in mesh with each other, so that at least an eccentric sum dimension formed form this individual eccentric dimensions of said eccentrics can be set variably, wherein said eccentric is directly attached to said drive shaft and said second eccentric is turnably attached to said first eccentric;
   an actuating element that connects said second eccentric with a control slide which can be acted upon axially; and
   a control piston which is acted upon by the pressure from the pump drive assembly, said control piston being lengthwise associated with the control slide in the form of a series mounting.

2. Drive assembly according to claim 1, wherein said control slide is guided on said first eccentric in a form-fit manner.

3. Drive assembly according to claim 1, wherein said actuating element is designed as a helical spring having a first and second spring end, said actuating element encompassing said first eccentric in part in a circumferential direction, said first spring end being attached to an end face of said second eccentric and said second spring end being attached to an end face of said control slide.

4. Drive assembly according to claim 1, wherein said actuating element performs an extension and a torsion of the second eccentric in circumferential direction in the event of a change in a distance dimension, said distance dimension prevailing between the first eccentric and the control slide.

5. Drive assembly for a self-controlled brake system, comprising:
   a drive shaft that rotates at a preselected shaft velocity;
   a housing adapted to movably received and guide said drive shaft;
   an eccentric device having a first eccentric member connected to said drive shaft and a second eccentric member disposed upon said first eccentric member;
   wherein said first eccentric member comprises a shaft with a first shaft end attached to said drive shaft such that said shaft moves eccentrically relative to said drive shaft, said shaft rotating at said shaft velocity;
   wherein said second eccentric member comprises a concentric sleeve that rotatably receives said shaft such that said sleeve moves eccentrically relative to said drive shaft, said sleeve being disposed on said shaft proximate said first shaft end;
   a control slide that is a concentric cylinder that slidably and rotatably receives a second shaft end; and
   a means for connecting said sleeve to said control slide and for eccentrically moving said sleeve relative to said drive shaft and for rotating said sleeve at a sleeve velocity relative to said shaft, in response to longitudinal movement of said control slide relative to said shaft, said connecting means being disposed around said shaft and having two ends, a first end attached to said control slide and a second end attached to said sleeve, said connecting means striving to maintain a preselected longitudinal distance between said sleeve and said control slide.

6. The drive assembly of claim 5, further comprising an engagement member disposed within a longitudinal groove along the inner peripheral surface of said slide and a longitudinal groove along the outer peripheral surface of said shaft proximate said second shaft end slide such that said slide rotates in unison with said shaft, said slide remaining free to move longitudinally relative to said shaft.

7. The drive assembly of claim 5, wherein said connecting means is a helical spring that is an essentially flat corrugated band having a width and a thickness, said width being greater than said thickness, said band having an arcuate shape such that said first end is separated from said second end by approximately 270 degrees.

* * * * *

UNITED STATES PATENT AND TRADEMARK OFFICE
CERTIFICATE OF CORRECTION

PATENT NO. : 5,340,285
DATED : Aug 23, 1994
INVENTOR(S) : Reinartz et al

It is certified that error appears in the above-indentified patent and that said Letters Patent is hereby corrected as shown below:

At line 2 of column 4 of claim 1, please delete "form this" and insert --from the--.

At line 31 of column 4 of claim 5, please delete "self-controlled" and insert --slip-controlled--; at line 35 of column 4, please delete "received" and insert --receive--.

Signed and Sealed this

Sixth Day of December, 1994

Attest:

BRUCE LEHMAN

*Attesting Officer*     *Commissioner of Patents and Trademarks*